(12) United States Patent
Teeter et al.

(10) Patent No.: US 9,917,762 B2
(45) Date of Patent: Mar. 13, 2018

(54) MICROBURST MONITORING SYSTEM

(71) Applicant: Dell Products L.P., Round Rock, TX (US)

(72) Inventors: Victor B. Teeter, Round Rock, TX (US); Christopher Stephen Petrick, Cedar Park, TX (US); Maunish Shah, Austin, TX (US); Joseph LaSalle White, San Jose, CA (US); Gerald David Myres, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 114 days.

(21) Appl. No.: 14/793,126

(22) Filed: Jul. 7, 2015

(65) Prior Publication Data

US 2017/0012851 A1   Jan. 12, 2017

(51) Int. Cl.
*H04L 12/28* (2006.01)
*H04L 12/26* (2006.01)
*H04L 12/863* (2013.01)
*H04L 12/823* (2013.01)
*H04L 12/825* (2013.01)
*H04L 12/56* (2006.01)

(52) U.S. Cl.
CPC ............ *H04L 43/16* (2013.01); *H04L 43/04* (2013.01); *H04L 47/263* (2013.01); *H04L 47/32* (2013.01); *H04L 47/6255* (2013.01)

(58) Field of Classification Search
CPC ................ G06F 2009/45579; H04L 49/90
USPC .............................................. 370/412
See application file for complete search history.

(56) References Cited

U.S. PATENT DOCUMENTS

| 8,107,486 B1* | 1/2012 | Walsh .................. H04L 49/103 370/351 |
| 2003/0147385 A1* | 8/2003 | Montalvo ............. H04L 47/125 370/389 |
| 2006/0092844 A1* | 5/2006 | Jeon ........................ H04L 47/14 370/235 |

(Continued)

OTHER PUBLICATIONS

Ren Y., Zhao Y., Liu P., Dou K. and Li J., "A Survey on TCP Incast in Data Center Networks", International Journal of Communication Systems, Jul. 11, 2012, vol. 27, Issue 8, pp. 1160-1172 , (/doi/10.1002/dac.v27.8/issuetoc), Wiley & Sons, Ltd., DOI: 10.1002/dac.2402, http://onlinelibrary.wiley.com/doi/10.1002/dac.2402/abstract.

*Primary Examiner* — Charles C Jiang
*Assistant Examiner* — Will Lin
(74) *Attorney, Agent, or Firm* — Haynes and Boone, LLP

(57) ABSTRACT

A microburst monitoring system includes a port and a memory system with an egress queue and a shadow queue that are associated with the port. A networking engine is coupled to the port and the memory system and configured to receive and process packets to provide egress frames for forwarding through the port. The networking engine then stores the egress frames in the egress queue, and stores information about each of the egress frames in the shadow queue. When the networking device determines that the storage of the egress frames has caused the egress queue to reach a threshold, the networking device causes the information about each of the egress frames in the egress queue to be captured, and that captured information may be analyzed to determine a source device that is generating at least some of the packets to be throttled.

20 Claims, 9 Drawing Sheets

(56) References Cited

U.S. PATENT DOCUMENTS

| | | | | |
|---|---|---|---|---|
| 2006/0101159 A1* | 5/2006 | Yeh | ............ | H04L 45/00 709/246 |
| 2007/0076604 A1* | 4/2007 | Litwack | ............ | H04L 43/0882 370/230 |
| 2008/0273546 A1* | 11/2008 | Johnson | ............ | H04L 49/251 370/419 |
| 2009/0086636 A1* | 4/2009 | Chow | ............ | H04L 47/10 370/236 |
| 2011/0026399 A1* | 2/2011 | Strulo | ............ | H04L 45/02 370/230 |
| 2014/0092914 A1* | 4/2014 | Kondapalli | ............ | H04L 49/109 370/412 |
| 2014/0254357 A1* | 9/2014 | Agarwal | ............ | H04L 47/12 370/229 |
| 2015/0381492 A1* | 12/2015 | Kamble | ............ | H04L 45/745 370/392 |

\* cited by examiner

MICROBURST MONITORING SYSTEM

BACKGROUND

The present disclosure relates generally to information handling systems, and more particularly to system for monitoring microbursts in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, networking devices (e.g., switches, routers, etc.) are utilized in routing data traffic through one or more paths in a network. In some situations, network applications may send data traffic simultaneously over the same path. For example, in storage area networks (SANs), financial networks, and/or other networks known in the art, data traffic can peak over the same path at the same time when rapid bursts of data packets are sent in quick succession in a phenomenon referred to as micro-bursting. Networking devices typically respond to micro-bursting and similar activity by queuing the data traffic when the bandwidth of a path is exceeded. However, such queuing increases latency, and in extreme situations the queues of the networking device can become filled in a matter of milliseconds, causing packets to be dropped. Such latency and packet dropping can also contribute to momentary network congestion by causing Transport Control Protocol (TCP) retransmissions.

The causes of congestion issues resulting from microbursting are often difficult, if not impossible, to determine in busy networks due to the lack of persistent information in the affected networking devices. For example, source information in packets may be tracked using existing Media Access Control (MAC) address and Address Resolution Protocol (ARP) tables, but such tracking does not include usage information that could be used to isolate microburst events (e.g., conventional MAC and ARP tables may only track addresses of packets or frames that are currently being processed). Some networking devices track usage information, but that usage information is spread over large time frames (e.g., 30 to 300 seconds) and is not associated with the addressing information. With micro-bursting occurring over much shorter durations (e.g., milliseconds), such activity ends up becoming "averaged out" with the normal traffic statistical views. Thus, micro-bursting events typically go undetected at the administration reporting levels.

Accordingly, it would be desirable to provide an improved microburst monitoring system.

SUMMARY

According to one embodiment, an information handling system (IHS) includes a chassis; a port included on the chassis; a control processing system located in the chassis; a memory system located in the chassis; a networking processing system located in the chassis and coupled to the port, the control processing system, and the memory system, wherein the networking processing system is configured to execute instructions to: provide a plurality of egress frames for transmitting through the port; store the plurality of egress frames in the egress queue; store information about each of the plurality of egress frames in the shadow queue; and provide a notification to the control processing system when the storage of the plurality of egress frames has caused the egress queue to reach a threshold, wherein the control processing system is configured to capture the information about each of the plurality of egress frames in the egress queue in response to the notification.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
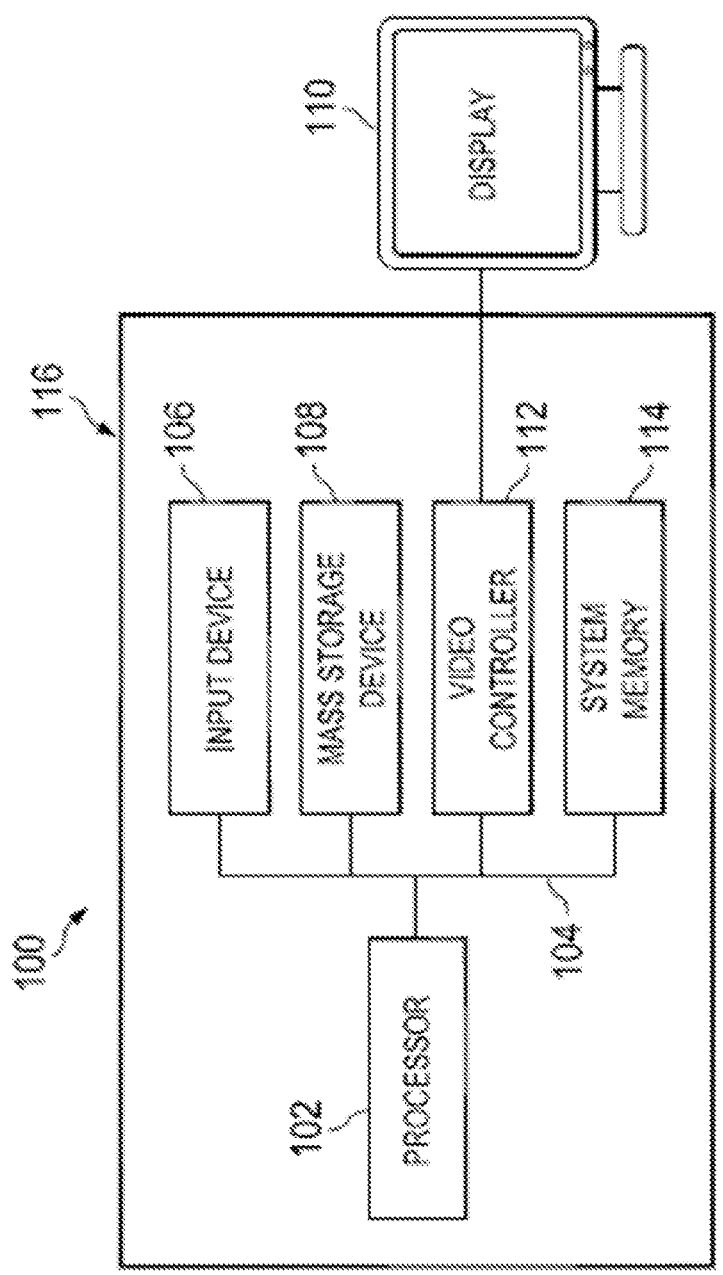
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
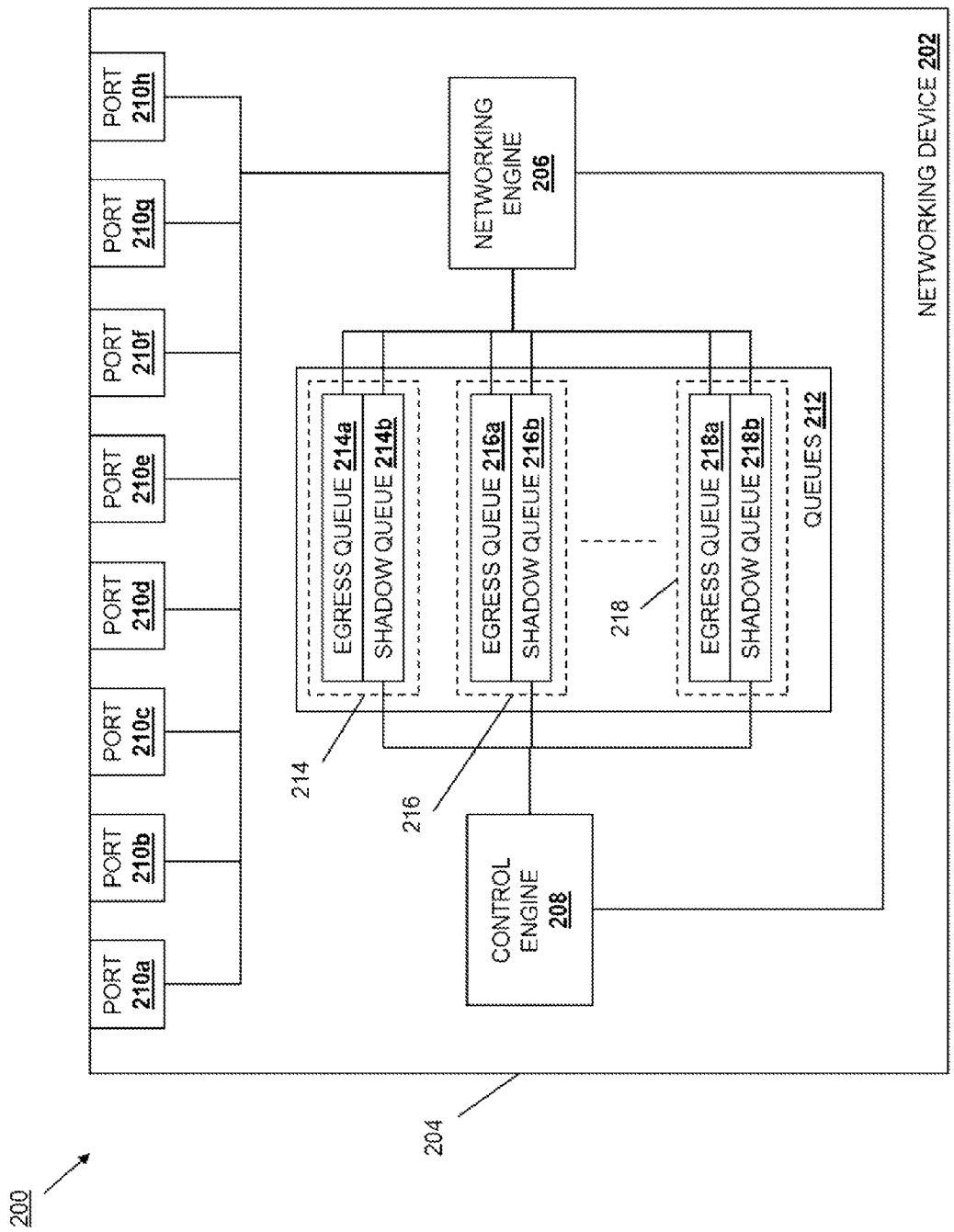
FIG. 2 is a schematic view illustrating an embodiment of a microburst monitoring system provided in a networking device.

Referring now to FIG. 2, an embodiment of a microburst monitoring system 200 is illustrated. In the illustrated embodiment, the microburst monitoring system 200 is provided in a networking device 202. However, one of skill in the art in possession of the present disclosure will recognize that the microburst monitoring system 200 may be provided in a variety of systems known in the art while remaining within the scope of the present disclosure. In an embodiment, the networking device 202 may be the IHS 100 discussed above with reference to FIG. 1 and/or may include some or all of the components of the IHS. For example, the networking device 202 may be a switch, a router, and/or a variety of other networking devices known in the art.

The networking device 202 includes a chassis 204 that houses the components of the networking device 202. In an embodiment, the networking device 202 includes one or more processing systems (not illustrated, but which may be the processor 102 discussed above with reference to FIG. 1) that are housed in the chassis 204 and one or more memory systems (not illustrated, but with may be the system memory 114 discussed above with reference to FIG. 1) that are housed in the chassis 204 and that includes instructions that, when executed by the one or more processing systems, cause the one or more processing systems to provide the engines that are configured to perform the functionality of the engines and networking devices discussed below. For example, in FIG. 2, each of a networking engine 206 and a control engine 208 are provided that are communicatively coupled together and configured to perform the functions of the networking engines, control engines, and networking device discussed below. A plurality of ports 210a, 210b, 210c, 210d, 210e, 210f, 210g, and 210h are provided on the networking device 202 (e.g., housed in the chassis 204, accessible on an outer surface of the chassis 204, etc.) and coupled to the networking engine 206 (e.g., via a coupling between the processing system and the ports 210a-210h). In the embodiments discussed below, the ports 210a-210h are described as Ethernet ports. However, other ports (e.g., optical ports on a Fibre Channel switch) are envisioned as falling within the scope of the present disclosure.

The memory system that is housed in the chassis 204 includes a plurality of queues 212 that, in the illustrated embodiment, include port-specific queue sets that each provide an egress queue and a shadow queue associated with one of the ports 210a-210h. For example, the plurality of queues 212 include a port specific queue set 214 that provides an egress queue 214a and a shadow queue 214b that are each associated with the port 210a, a port specific queue set 216 that provides an egress queue 216a and a shadow queue 216b that are each associated with the port 210b, and up to a port specific queue set 218 that provides an egress queue 218a and a shadow queue 218b that are each associated with the port 210h (it should be understood that port specific queue sets are included in the plurality of queues 212 that provide egress queues and shadow queues associated with the ports 210c-210g as well.)

In the illustrated embodiment, the networking engine 206 is coupled to each of the egress queues and the shadow queues provided by each of the port-specific queue sets 214, 216, and up to 218, and the control engine 208 is coupled to each of the shadow queues in the port-specific queue sets 214, 216, and up to 218. While a specific embodiment of the microburst monitoring system 200 is illustrated in the networking device 202 in FIG. 2, a wide variety of modification to that embodiment is envisioned as falling within the scope of the present disclosure. For example, rather than providing port-specific queue sets that include an egress queue and a shadow queue associated with each port, egress queues and shadow queues may be associated with more than one port, more than one shadow queue may be provided for each egress queue, more than one egress queue may be provided with a shadow queue, etc. As such, the specific configurations and associations of the egress queues and shadow queues with each other and the ports 210a-210h are provided merely as an example, and one of skill in the art in possession of the present disclosure will recognize that the use of the egress queues and shadow queues as discussed below will be beneficial using a variety of egress queue, shadow queue, and port associations and thus will fall within the scope of the present disclosure.

Figure 3:
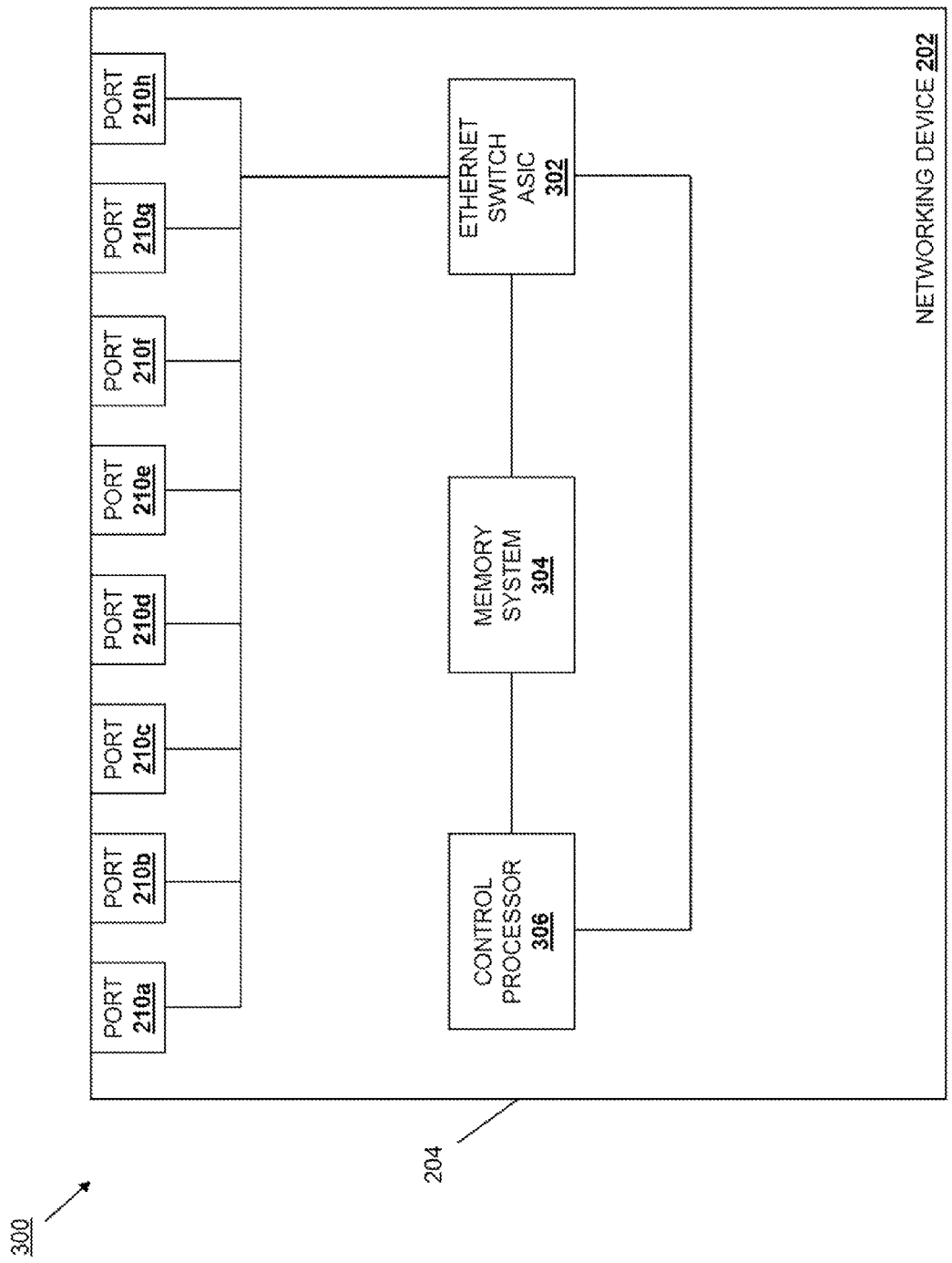
FIG. 3 is a schematic view illustrating an embodiment of the microburst monitoring system of FIG. 2.

Referring now to FIG. 3, an embodiment of a microburst monitoring system 300 is illustrated. The illustrated embodiment of the microburst monitoring system 300 is provided in the networking device 202 discussed above with reference to FIG. 2 in order to illustrate components that may be used to provide the microburst monitoring system 200 of FIG. 2 and, as such, similarly components are given similar reference numbers. In the microburst monitoring system 300, a networking processing system that is illustrated as an Ethernet switch Application Specific Integrated Circuit (ASIC) 302 is coupled to the ports 210a-210h and provides the networking engine 206 of FIG. 2. In an embodiment, the Ethernet switch ASIC 302 may provide for a variety of conventional networking device functionality that is not described in detail herein, but that may include processing received packets for forwarding through a network. The Ethernet switch ASIC 302 is coupled to a memory system 304 that may include one or more memory devices that provide the plurality of queues 212 of FIG. 2. For example, the memory system 304 may include an Ethernet switch ASIC memory device that is provided for the Ethernet switch ASIC 302 and that includes the plurality of queues 212. In another example, the memory system 304 may include a plurality of memory devices that are accessible by the Ethernet switch ASIC 302, with the egress queues included on a first subset of the plurality of memory devices, and the shadow queues provided on a second subset of the plurality of memory devices or another onboard space allocated for monitoring microburst events. While a few examples have been provided, one of skill in the art in possession of the present disclosure will recognize that a variety of memory system and memory device configurations for providing the plurality of queues 212 will fall within the scope of the present disclosure. A control processing system that is illustrated as a control processor 306 is coupled to each of the Ethernet switch ASIC 302 and the memory system 304 and provides the control engine 208 of FIG. 2. In an embodiment, the control processor 306 may provide for a variety of control functionality that is not described in detail herein, but that may provide for a variety of different control functions for the networking device 202.

Figure 4:
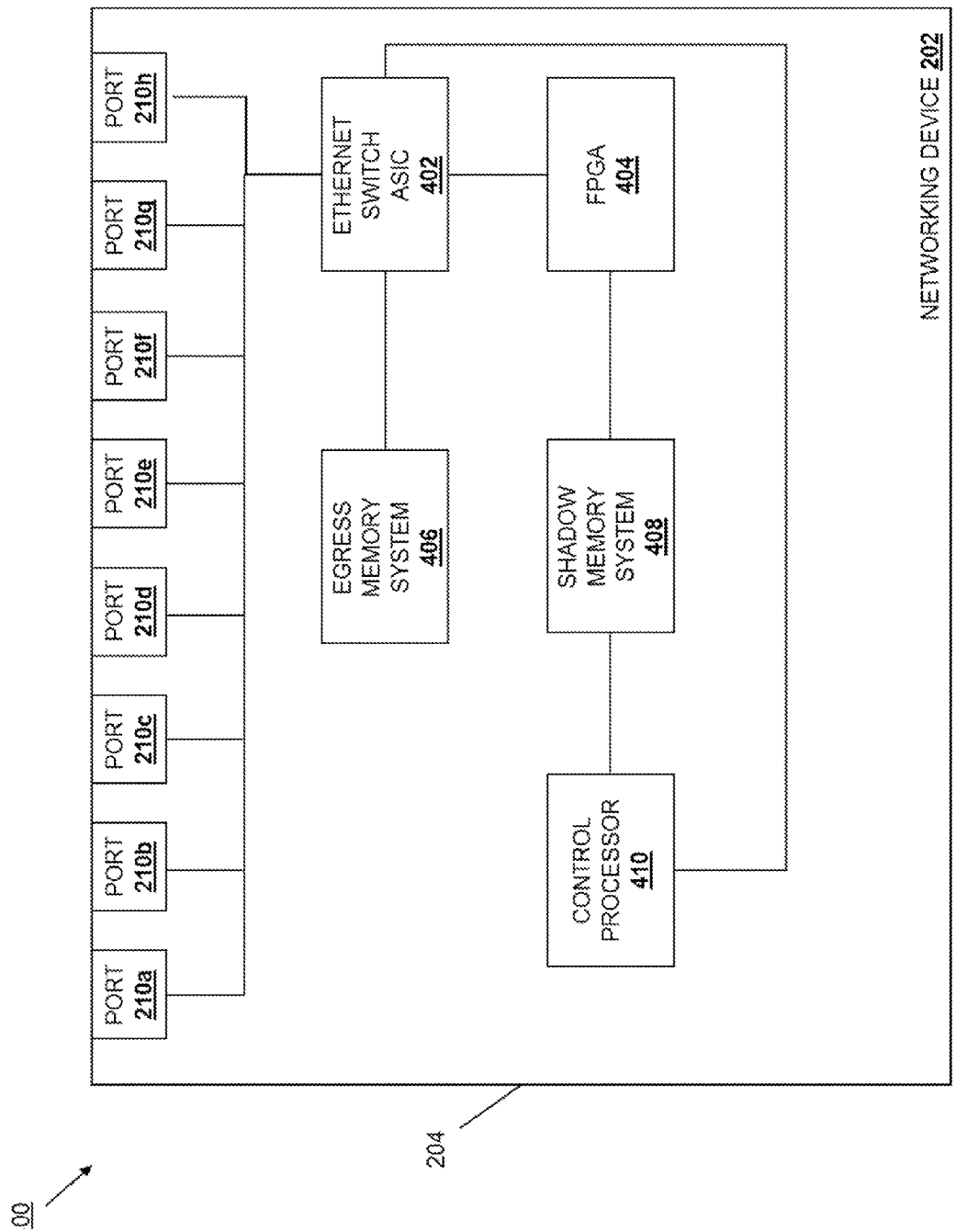
FIG. 4 is a schematic view illustrating an embodiment of the microburst monitoring system of FIG. 2.

Referring now to FIG. 4, an embodiment of a microburst monitoring system 400 is illustrated. The illustrated embodiment of the microburst monitoring system 400 is provided in the networking device 202 discussed above with reference to FIG. 2 in order to illustrate components that may be used to provide the microburst monitoring system 200 of FIG. 2 and, as such, similarly components are given similar reference numbers. In the microburst monitoring system 400, an Ethernet switch ASIC 402 is coupled to the ports 210a-210h and to a Field Programmable Gate Array (FPGA) 404. The Ethernet switch ASIC 402 and the FPGA 404 may provide the networking engine 206 of FIG. 2. In an embodiment, the Ethernet switch ASIC 402 is a primary networking processing system that is configured to provide for a variety of conventional networking device functionality that is not described in detail herein, but that may include processing received packets for forwarding through a network, while the FPGA 404 is a secondary processing system that may provide for the "shadowing" of egress frames that have been processed for egress through one of the ports 210a-210h, as discussed in further detail below.

The Ethernet switch ASIC 402 is coupled to an egress memory system 406 that may include one or more memory devices that provide the egress queues in the port-specific queue sets of the plurality of queues 212 of FIG. 2. For example, the egress memory system 406 may include an Ethernet switch ASIC memory device that is provided for the Ethernet switch ASIC 402 and that includes egress queues associated with the ports 210a-210h. The FPGA 404 is coupled to a shadow memory system 408 that may include one or more memory devices that provide the shadow queues in the port-specific queue sets of the plurality of queues 212 of FIG. 2. For example, the shadow memory system 408 may include a memory device that is provided for the FPGA 404 and that includes shadow queues associated with the ports 210a-210h. While a few examples have been provided, one of skill in the art in possession of the present disclosure will recognize that a variety of memory system and memory device configurations for providing the egress memory system 406 and the shadow memory system 408 will fall within the scope of the present disclosure. A control processor 306 is coupled to each of the Ethernet switch ASIC 402 and the shadow memory system 408 and provides the control engine 208 of FIG. 2. In an embodiment, the control processor 410 may provide for a variety of control functionality that is not described in detail herein, but that may provide for a variety of different control functions for the networking device 202.

Figure 5:
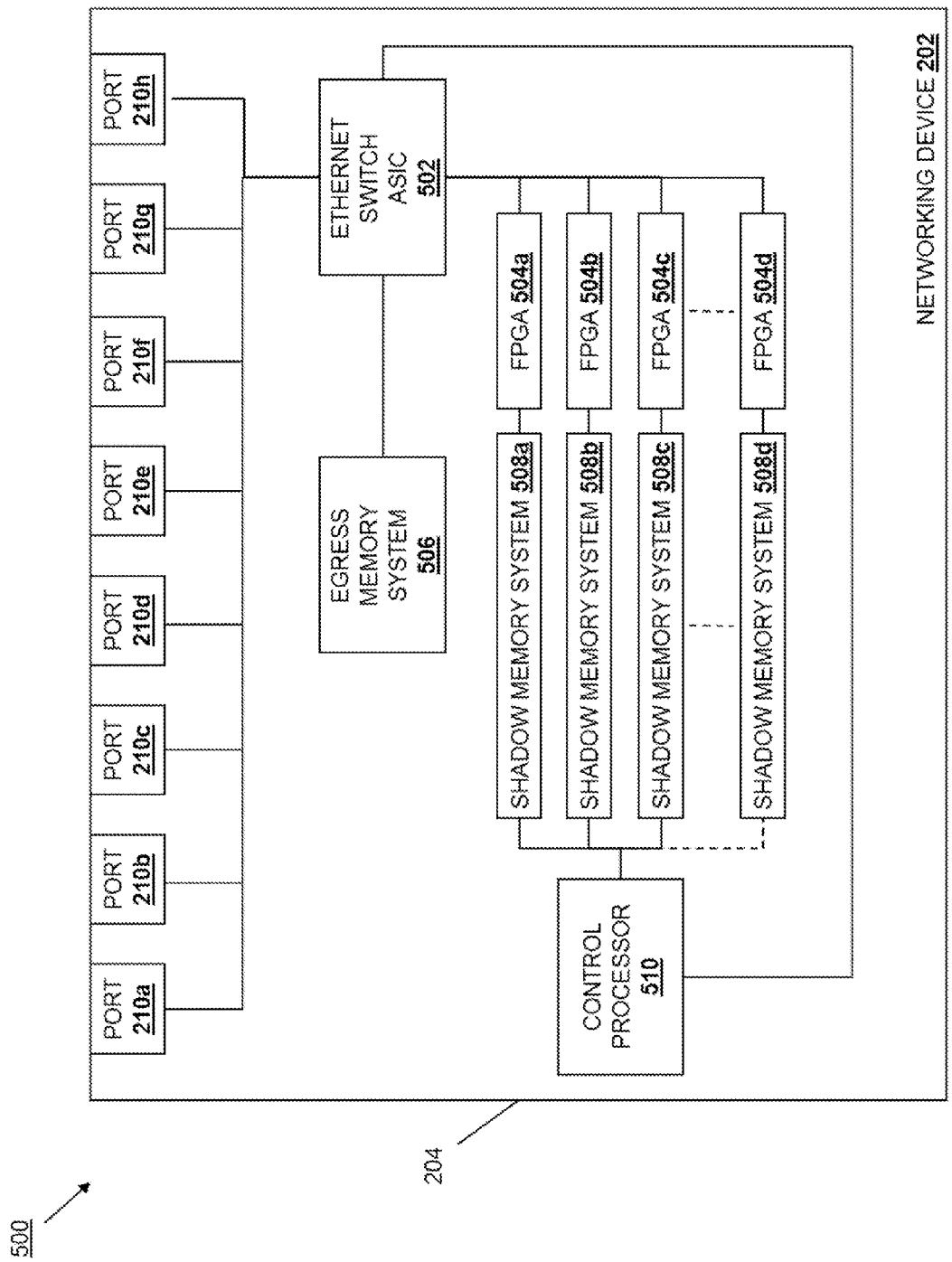
FIG. 5 is a schematic view illustrating an embodiment of the microburst monitoring system of FIG. 2.

Referring now to FIG. 5, an embodiment of a microburst monitoring system 500 is illustrated. The illustrated embodiment of the microburst monitoring system 500 is provided in the networking device 202 discussed above with reference to FIG. 2 in order to illustrate components that may be used to provide the microburst monitoring system 200 of FIG. 2 and, as such, similarly components are given similar reference numbers. In the microburst monitoring system 500, an Ethernet switch ASIC 502 is coupled to the ports 210a-210h and to a plurality of FPGAs 504a, 504b, 504c, and up to 504d. The Ethernet switch ASIC 502 and the FPGAs 504a-d may provide the networking engine 206 of FIG. 2. In an embodiment, the Ethernet switch ASIC 502 is a primary networking processing system that may provide for a variety of conventional networking device functionality that is not described in detail herein, but that may include processing received packets for forwarding through a network, while the FPGAs 504a-d are a secondary processing system that may provide for the "shadowing" of egress frames that have been processed for egress through one of the ports 210a-210h, as discussed in further detail below. For example, each of the FPGAs 504a-d may be provided for the shadowing of frames processed for egress through a respective port (e.g., the FPGA 504a may be provided for the port 210a, the FPGA 504b may be provided for the port 210b, and so on).

The Ethernet switch ASIC 502 is coupled to an egress memory system 506 that may include one or more memory devices that provide the egress queues in the port-specific queue sets of the plurality of queues 212 of FIG. 2. For example, the egress memory system 506 may include an Ethernet switch ASIC memory device that is provided for the Ethernet switch ASIC 502 and that includes egress queues associated with the ports 210a-210h. Each of the FPGAs 504a, 504b, 504c, and up to 504d may be coupled to a respective shadow memory system 508a, 508b, 508c, and up to 508d that may include one or more memory devices that provide the shadow queues in the port-specific queue sets of the plurality of queues 212 of FIG. 2. For example, each shadow memory system 508a-d may include a memory device that is provided for its respective FPGA 504a-d and that includes a shadow queue associated with one of the ports 210a-210h (e.g., the shadow memory system 508a may be provided for the port 210a, the shadow memory system 508b may be provided for the port 210b, and so on). While a few examples have been provided, one of skill in the art in possession of the present disclosure will recognize that a variety of memory system and memory device configurations for providing the egress memory system 506 and the shadow memory systems 508a-d will fall within the scope of the present disclosure. A control processor 510 is coupled to each of the Ethernet switch ASIC 502 and the shadow memory systems 508a-d and provides the control engine 208 of FIG. 2. In an embodiment, the control processor 510 may provide for a variety of control functionality that is not described in detail herein, but that may provide for a variety of different control functions for the networking device 202.

The embodiments of the microburst monitoring systems 200, 300, 400, and 500 have been provided as examples of implementations of components, configurations, and association that may be utilized to provide the functionality of the method discussed below. However, one of skill in the art in possession of the present disclosure will recognize that different combinations of the systems 200, 300, 400, and 500 illustrated and described above with reference to FIGS. 2, 3, 4, and 5, as well as additions and modifications to those systems, will fall within the scope of the present disclosure. In one specific example, multiple networking processing systems (e.g., multiple, different Ethernet switch ASICs) may provide different egress queues that may be shadowed by the same shadow queue, and the information in the shadow queue may identify the networking processing system that provides the egress queue which is being shadowed by that information. Thus, while specific references to the systems 200, 300, 400, and 500 are made below to illustrate how the functionality of the method may be realized, a wide variety of modification and addition to those systems is envisioned as falling within the scope of the present disclosure.

Figure 6:
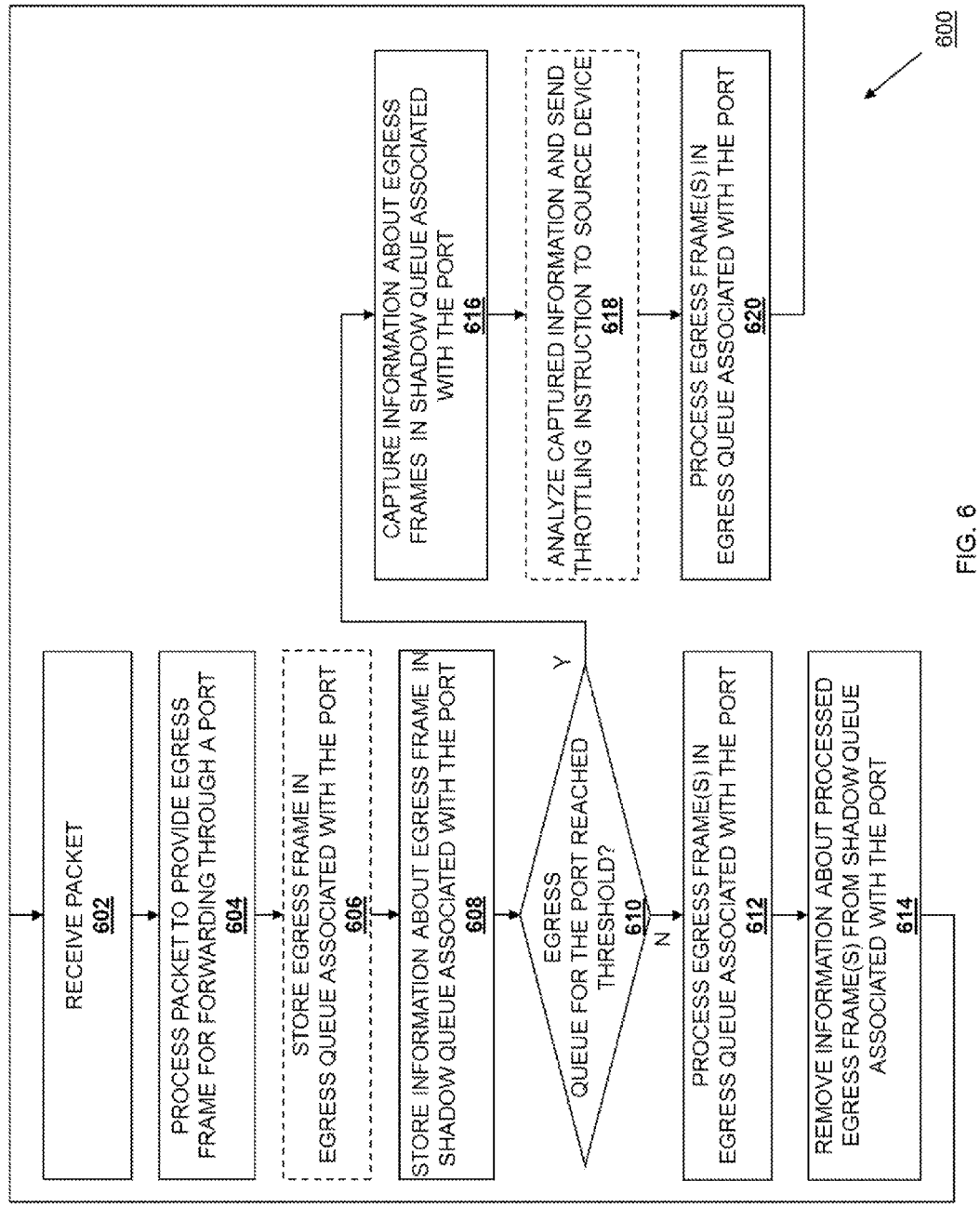
FIG. 6 is a flow chart illustrating an embodiment of a method for monitoring microbursts.

Referring now to FIG. 6, a method 600 for monitoring microbursts is illustrated. As discussed in detail below, the microburst monitoring systems described herein process packets into frames for forwarding through ports and send those frames to egress queues associated with those ports, while also providing respective secondary, or "shadow", queues for each port in which information about the frames in the egress queues is stored. When an egress queue associated with a port reaches a threshold, the information in the shadow queue associated with that port is captured such that it may be analyzed to determine the cause of the egress queue reaching the threshold. As discussed in further detail below, this allows for the processing of frames in the egress queue without interruption while still providing the ability to capture information about the cause of the filling of the egress queue. As would be understood by one of skill in the art in possession of the present disclosure, the volume and rate of traffic in a typical network makes it very difficult to continually track the and capture information about the egress frames directly from the egress queue without adversely affecting performance of the network, and the shadow queues of the present disclosure allow such tracking and capture without any adverse network performance effects. While such functionality is discussed below as being utilized in the monitoring of microbursts, one of skill in the art in possession of the present disclosure will recognize that other congestions scenarios will benefit from the teaching of the present disclosure and thus will fall within its scope.

The method 600 begins at block 602 where a packet is received. In an embodiment, the networking engine 206 receives a packet through one or more of the ports 210a-210h. For example, any of the Ethernet switch ASICs 302, 402, and/or 502 in FIGS. 3, 4, and 5 may receive a packet through one or more of the ports 210a-210h at block 602. As is known in the art, the packet received at block 602 may be sent by a source device that is coupled to one or more of the ports 210a-210h though a network (e.g., a Local Area Network (LAN), the Internet, etc.), and may be directed to a destination device that is coupled to one or more of the ports 210a-210h through the network. As would be understood by one of skill in the art in possession of the present disclosure, the networking engine 206 may receive any number of packets over multiple iterations of the method 600 from any number of source devices, and process those packets for forwarding to any number of destination devices.

The method 600 then proceeds to block 604 where the packet is processed to provide an egress frame for forwarding through a port. In an embodiment, the networking engine 206 processes the packet that was received at block 602 by, for example, determining a destination of the packet, determining an egress port on the networking device 202 for forwarding the packet to a destination device associated with the destination of the packet, encapsulating the packet in an egress frame, and/or performing a variety of other packet processing actions known in the art, in order to provide an egress frame for forwarding through one of the ports 210a-210h. For example, any of the Ethernet switch ASICs 302, 402, and/or 502 in FIGS. 3, 4, and 5 may process the packet to provide the egress frame for forwarding through the port at block 604. In the embodiments discussed below, the egress frames provided at block 604 for the packets received at block 602 are directed to the egress queue 214 associated with port 210a (e.g., the networking engine 206 determines that those egress frames may be forwarded through port 210a to reach the destination device associated with their destinations). However, one of skill in the art in possession of the present disclosure will recognize that different destinations of egress frames may require directing those egress frames to different ports and their associated egress queues.

The method 600 then proceeds to optional block 606 where the egress frame is stored in an egress queue associated with the port. In an embodiment, the networking engine 206 sends the egress frame provided at block 604 to the egress queue 214a in the port specific queue set 214 for the port 210a. For example, the Ethernet switch ASIC 302 in FIG. 3 may store the egress frame in the egress queue 214a that is provided in the memory system 304 and associated with the port 210a. In another example, the Ethernet switch ASIC 402 in FIG. 4 may store the egress frame in the egress queue 214a that is provided in the egress memory system 406 and associated with the port 210a. In another example, the Ethernet switch ASIC 502 in FIG. 5 may store the egress frame in the egress queue 214a that is provided in the egress memory system 506 and associated with the port 210a. Block 606 is illustrated as optional because, as is known in the art, in some situations an egress queue associated with a port may become full and subsequent egress frames directed to that egress queue are then dropped. As such, in some embodiments, the networking engine 206 may direct an egress frame to the egress queue 214a associated with the port 210a, but that egress frame may be dropped due to that egress queue 214a being full. For example, a microburst scenario may result in the networking engine 206 receiving a relatively large number of packets in a relatively short amount of time, and the processing of those packets may result in a large number of egress frames being directed to the egress queue 214a associated with port 210a such that those egress frames are stored in the egress queue 214a until it is full, and subsequently at least one egress frame directed to the port 210a is dropped. However, in many embodiments the egress queue 214a for the port 210a will not be full, and egress frames will be stored in the egress queue 214a for subsequent forwarding through the port 210a as discussed below.

The method 600 then proceeds to block 608 where information about the egress frame is stored in a shadow queue associated with the port. In the embodiments discussed below, the information about the egress frames is stored in the shadow queue for each respective egress frame provided at block 604, and may be removed from the shadow queue as those egress frames are processed and forwarded through the port. However, in other embodiments (e.g., when the memory system that provides the shadow queue is relatively small), the storage of the information about the egress frames in the shadow queue at block 608 may only occur after the number of egress frames in the egress queue reaches a first threshold level (e.g., some percentage of the capacity of the shadow queue), and the capture of that information (discussed below with reference to block 616) may occur upon the egress queue reaching a second threshold level (e.g., in response to the egress queue reaching capacity such that subsequent egress frames are dropped, in response to the egress queue reaching close to capacity such that egress frames are about to be dropped etc.) In such embodiments, block 608 may only be performed between the first and second threshold levels discussed above. Thus, modifications to the method 600 below may be provided to address features such as a limited memory system to provide for the most efficient use of that memory system in the microburst monitoring system of the present disclosure.

In an embodiment, the networking engine 206 sends information about the egress frame provided at block 604 to the shadow queue 214b in the port specific queue set 214 for the port 210a. In some embodiments, the information about the egress frame that is stored in the shadow queue may be a subset of the information included in the packet/egress frame such as, for example, a source address (e.g., a Media Access Control (MAC) address, an IPv4 address, an IPv6 address, a Virtual Local Area Network Address (VLAN) address, etc.), a destination address (e.g., a MAC address an IPv4 address, an IPv6 address, a VLAN address), a packet size, and/or other packet/frame header addressing information known in the art. In one example, the storage of the subset of information about the egress frame may be beneficial in systems that have a relatively limited memory system for providing the shadow queue (e.g., systems such as the microburst monitoring system 300 of FIG. 3 in which the memory system 304 may include a limited memory capacity provided for the conventional operation of the Ethernet switch ASIC 302). In such examples, the memory capacity used for the shadow queues may be a relatively small fraction of the memory capacity used for the egress queues.

In some embodiments, the information about the egress frame that is stored in the shadow queue may be a copy of the information included in the packet/egress frame such that the shadow queue stores copies of the egress frames that are stored in its associated egress queue. In one example, the storage of copies of the egress frames may be beneficial in systems that have a relatively large memory system for providing the shadow queue (e.g., systems such as the microburst monitoring systems 400 and 500 of FIGS. 4 and 5 in which the shadow memory systems 408 and 508a-d provide memory devices dedicated to providing the shadow queues (and, in the case of the microburst monitoring system 500, at least one memory device provided for the shadow queue associated with each port/egress queue). In some embodiments, the information about the egress frame that is stored in the shadow queue may be information that is not included in the packet/egress frame such that the shadow queue stores additional information about the egress frame that is not included in its associated egress queue. In one example, the storage of information about the egress frames that is not included in the egress frames may be beneficial in the systems discussed above that have a relatively large memory system for providing the shadow queue, and that additional information may include port numbers of the egress ports, date/time stamps for each microburst, microburst occurrence identifiers, packet sequence identifiers (e.g., as copied from the egress queue), system "up" time, thresholds, and/or a variety of other information known in the art. As such, the information about the egress frame that is stored in the shadow queue may depend on the memory system available for storing the shadow queue. In addition, combinations of the amount and type of information about the egress frame that is stored in the shadow queue may differ by port (e.g., more information may be stored about egress frames directed to particular ports).

In one embodiment of block 608, the Ethernet switch ASIC 302 in FIG. 3 may store the information about the egress frame in the shadow queue 214b that is provided in the memory system 304 and associated with the port 210a. In that example, the Ethernet switch ASIC 302 provides for both the storage of the egress frame in the egress queue 214a and the storage of the information about the egress frame in the shadow queue 214b. As such, in a specific example the Ethernet switch ASIC 302 in the networking device 202 may be configured to process packets to provide egress frames for forwarding through one of its ports, store those egress frames in the egress queue for that port that is provided by its memory system 304, and store information about those egress frames in the shadow queue for that port that is provided by its memory system 304.

In other embodiments of block 608, dedicated subsystems may be provided to store the information about the egress frame in the shadow queue 214b. In one embodiment, the Ethernet switch ASIC 402 in FIG. 4 may communicate to the FPGA 404 about the egress frame that was provided in block 604, and the FPGA 404 may store the information about that egress frame in the shadow queue 214b that is provided in the shadow memory system 408 and associated with the port 210a. For example, the Ethernet switch ASIC 402 may communicate the subset of information about the egress frame, the entire egress frame, and/or additional information about the egress frame to the FPGA 404, and the FPGA 404 may store that information in the shadow memory system 408. As such, the FPGA 404 and shadow memory system 408 may be provided as a dedicated subsystem for providing shadow queues for each of the plurality of ports 210a-210h and their egress queues (which may be provided in the egress memory system 406 as discussed above). In another embodiment, the Ethernet switch ASIC 502 in FIG. 5 may communicate to the FPGA 504a that is associated with the port 210a about the egress frame that was provided in block 604, and the FPGA 504a may store the information about that egress frame in the shadow queue 508a that is associated with the port 210a. For example, the Ethernet switch ASIC 502 may communicate the subset of information about the egress frame, the entire egress frame, and/or additional information about the egress frame to the FPGA 504a, and the FPGA 504a may store that information in the shadow memory system 508a. As such, the FPGA 504a and shadow memory system 508a may be provided as a dedicated subsystem for providing the shadow queue for the port 210a and its egress queue (which may be provided in the egress memory system 506 as discussed above). Similarly, the FPGA 504b/shadow memory system 508b may be provided as a dedicated subsystem for providing the shadow queue for the port 210b and its egress queue, the FPGA 504c/shadow memory system 508c may be provided as a dedicated subsystem for providing the shadow queue for the port 210b and its egress queue, and so on.

Figure 7A:
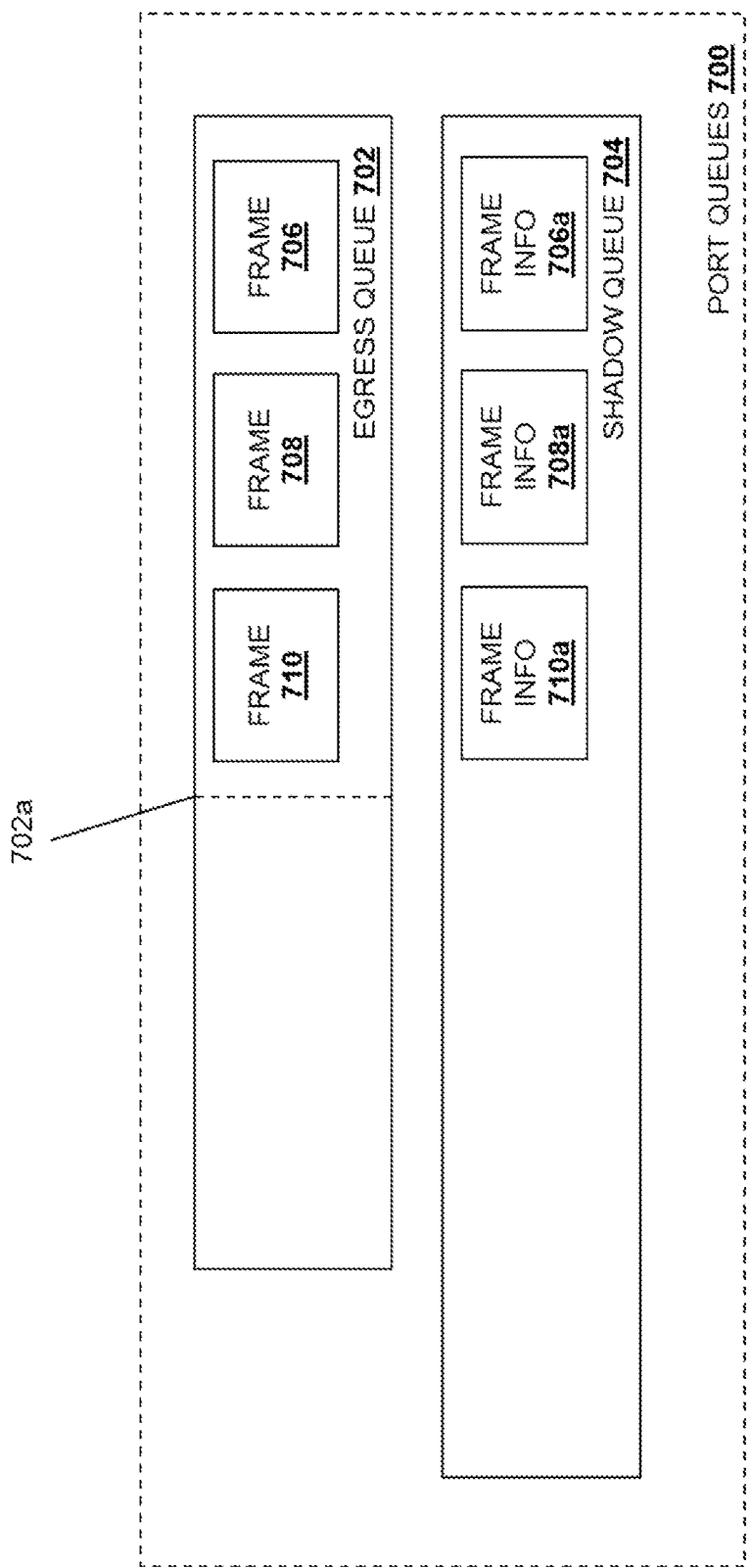
FIG. 7A is a schematic view illustrating an embodiment of queues in the microburst monitoring system of FIG. 2 during the method of FIG. 6.

Referring now to FIG. 7A, an embodiment of port queues 700 for a port is illustrated. In an embodiment, the port queues 700 may be the port specific queue set 214 discussed above (as well as any of the other port specific queue sets illustrated in FIG. 2.) As such, the port queues 700 may be associated with a particular port on the networking device 202 (e.g., the port 210a discussed above), and include an egress queue 702 and a shadow queue 704. In the illustrated embodiment, a threshold 702a is associated with the egress queue 702 that is below the capacity of the egress queue 702

(i.e., the egress queue 702 can store egress frames beyond the threshold before becoming full.) However, as discussed below, in some embodiments, the threshold 702a may coincide with the capacity of the egress queue 702 (e.g., the threshold discussed below with regard to decision block 610 may be reached when the egress queue 702 becomes full) while remaining within the scope of the present disclosure. As discussed above, in some embodiments the threshold 702a of the egress queue 702 may be considered a first threshold level that triggers the storage of the information about the egress frames in the shadow queue 704 at block 608, and the filling of the egress queue 702 may be considered a second threshold level that triggers the capture of the information about the egress frames in the shadow queue 704 as discussed below. Thus, a wide variety of threshold(s) may be defined and utilized with the egress queue 702 while remaining within the scope of the present disclosure.

Furthermore, while the shadow queue 704 is illustrated and described below as "larger" than the egress queue 702 (i.e., able to hold more egress frame info than associated egress frames), in other embodiments, the shadow queue 704 may be smaller than the egress queue 702 (e.g., in total memory capacity when the shadow queue 704 only stores a subset of the information included in the corresponding egress frames in the egress queue 702) or larger than the egress queue 702 (e.g., in total memory capacity, in ability to store information and/or egress frames that exceed the number that can be stored in the egress queue 702) while remaining within the scope of the present disclosure.

In the illustrated embodiment, the egress queue 702 includes an egress frame 706, an egress frame 708, and an egress frame 710, each of which may have been provided at block 604 of the method 600 and stored in the egress queue 702 at block 606 of the method 600. As such, the shadow queue 704 in the illustrated embodiment includes egress frame information 706a that is associated with the egress frame 706 as discussed above, egress frame information 708a that is associated with the egress frame 708 as discussed above, and egress frame information 710a that is associated with the egress frame 710 as discussed above, each of which may have been stored in the shadow queue 704 at block 608 of the method 600. As such, FIG. 7A illustrates an embodiment of the port queues 700 for the port 210a after some number of iterations of the method 600 prior to the egress queue 702 exceeding the threshold 702a (discussed below), and thus includes egress frames stored in the egress queue 702 for the port 210a and egress frame information stored in the shadow queue 704 for the port 210a.

The method 600 then proceeds to decision block 610 where it is determined whether the egress queue for the port has reached a threshold. As discussed above, a threshold may be provided with the egress queue associated with each port. For example, the egress queue 702 may include a queue depth that indicates the count of egress frames waiting in the egress queue 702 for forwarding through the port 210a, and the threshold may reference that queue depth as a threshold number of frames indicated by the queue depth. In a specific example, the threshold 702a for the egress queue 702 illustrated above in FIG. 7A is defined for the port 210a, and at decision block 610, the networking engine 206 may determined whether that threshold has been reached. As illustrated in FIG. 7A, the threshold 702a may be less than the capacity of the egress queue 702. However, as discussed above, in other embodiments the threshold 702a may be the capacity of the egress queue 702 such that the threshold 702a is reached when the egress queue is filled (e.g., when the performance of block 608 is dependent on a first threshold level of the egress queue being reached). In an embodiment, the threshold 702a may be provided for the egress queue 702 by the control engine 208 (e.g., the control processors 306, 410, and 510 illustrated in FIGS. 3, 4, and 5), and may be selected (e.g., by a user, an administrator, a manufacturer, etc.) such that it is indicative of a microburst event. For example, in a specific embodiment, the threshold 702a may include a plurality of threshold levels that are separated by some number of egress frame slots in the egress queue 702, and the networking engine 206 may monitor the rate at which egress frames exceed a first threshold level and the following second (or subsequent) threshold levels to determine whether a microburst event is occurring. However, a single threshold level may also be set to capture a microburst event and/or other congestion situations known in the art.

If, at decision block 610, the networking engine 206 determines that the threshold 702a for the egress queue 702 has not been reached (e.g., as illustrated in FIG. 7A), the method 600 may proceed to block 612 where egress frames in the egress queue associated with the port are processed. In an embodiment, the networking engine 206 may operated at block 612 to process the egress frames that were stored in the egress queue 214a at block 606 such that they are forwarded through the port 210a. For example, any of the Ethernet switch ASICs 302, 402, and/or 502 in FIGS. 3, 4, and 5 may process the egress frames 706, 708, and/or 710 in the egress queue 702 such that those egress frames are forwarded through the port 210a to their destination. As such, the egress frames stored in that egress queue 702 are processed and forwarded through the port 210a such that the number of egress frames in the egress queue 702 varies through iterations of the method 600.

The method 600 then proceeds to block 614 where information about the processed egress frames is removed from the shadow queue associated with the port. In an embodiment, the networking engine 206 removes the information about the egress frame(s) that were processed at block 612 from the shadow queue 214b in the port specific queue set 214 for the port 210a. In some embodiments, the information about the egress frames in the egress queue that were processed may be removed from the shadow queue immediately following the processing of those egress frames. However, in some embodiments, there may be some delay or time period between the processing of the egress frames in the egress queue 702 and the removal of the corresponding information about the egress frames from the shadow queue 704, and that delay or time period may be selected (e.g., by a user, administrator, manufacturer, etc.) based on a variety of desired microburst monitoring factors for the port 210a (e.g., based on a desired history of egress frame analysis for a microburst event). In addition, such delays or time periods may be dictated by the size of the memory system used to provide the shadow queue (with larger memory systems allowing for the storage of information about the egress frames for longer amounts of time.)

In one embodiment of block 614, the Ethernet switch ASIC 302 in FIG. 3 may remove the information about the egress frame from the shadow queue 214b that is provided in the memory system 304 and associated with the port 210a. In that example, the Ethernet switch ASIC 302 provides for both the processing of the egress frame in the egress queue 214a for forwarding through the port 210a, and the removal of the information about the egress frame from the shadow queue 214b. As such, in a specific example the Ethernet switch ASIC 302 in the networking device 202 may be configured to process egress frames in egress queues for forwarding through its ports, and removing information about those egress frames from the shadow queue for those ports that is provided by its memory system 304.

In other embodiments of block 614, the dedicated subsystems may remove the information about the egress frame from the shadow queue 214b. In one embodiment, the Ethernet switch ASIC 402 in FIG. 4 may communicate to the FPGA 404 about the egress frame that was processed in block 612, and the FPGA 404 may remove the information about that egress frame from the shadow queue 214b that is provided in the shadow memory system 408 and associated with the port 210a. For example, the Ethernet switch ASIC 402 may communicate some subset of information about the egress frame, the entire egress frame, and/or other information associated with the egress frame to the FPGA 404, and the FPGA 404 may then determine and remove the information about that egress frame from the shadow memory system 408. In another embodiment, the Ethernet switch ASIC 502 in FIG. 5 may communicate to the FPGA 504a that is associated with the port 210a about the egress frame that was processed in block 612, and the FPGA 504a may remove the information about that egress frame from the shadow queue 508a that is associated with the port 210a. For example, the Ethernet switch ASIC 502 may communicate some subset of information about the egress frame, the entire egress frame, and/or other information associated with the egress frame to the FPGA 504a, and the FPGA 504a may then determine and remove the information about that egress frame from the shadow memory system 508a. Similarly, the FPGA 504b/shadow memory system 508b, the FPGA 504c/shadow memory system 508c, and other FPGA/shadow memory systems provided for particular ports on the networking device 202 may operate in the same manner. The method 600 then returns to block 602 when the method 600 repeats substantially as discussed above.

Figure 7B:
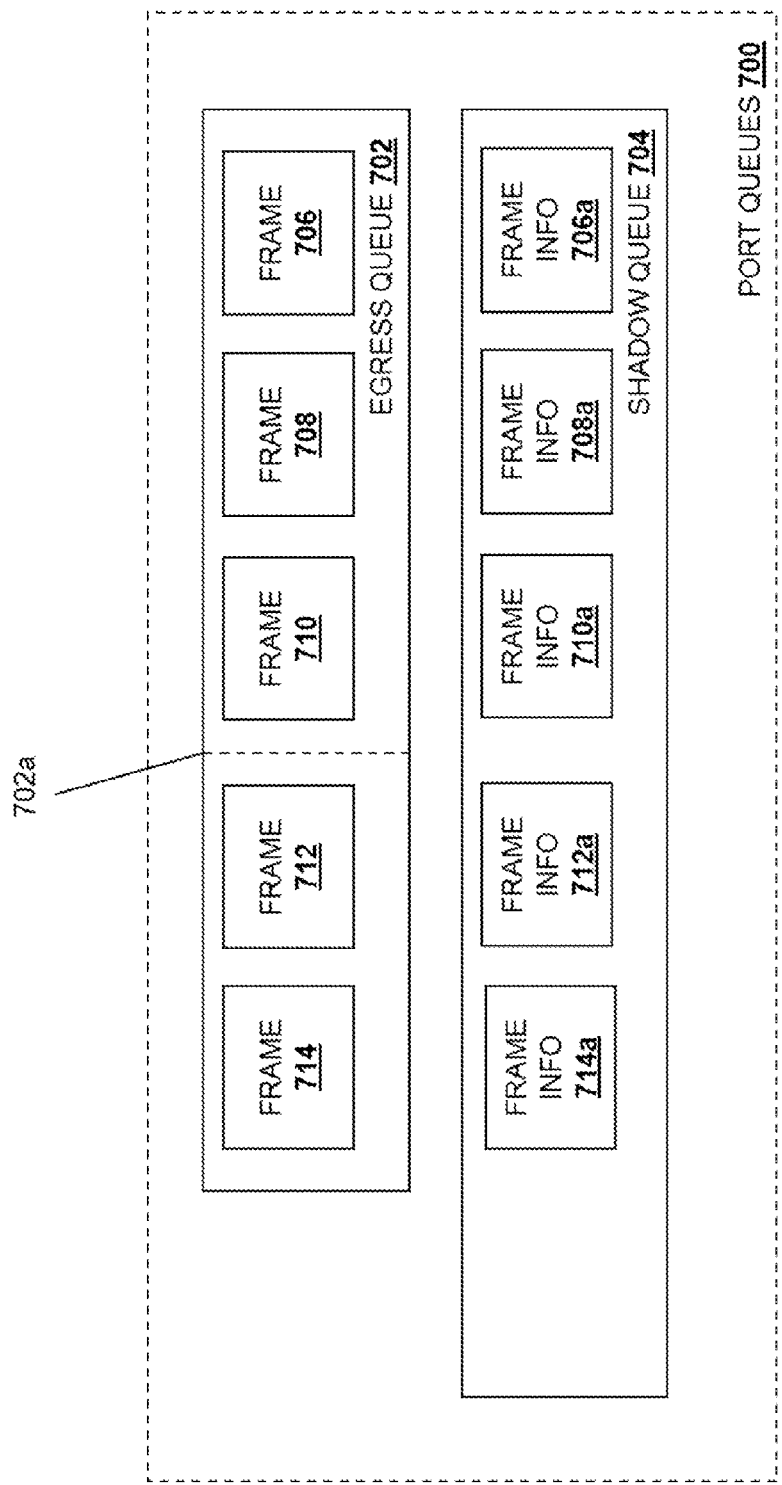
FIG. 7B is a schematic view illustrating an embodiment of queues in the microburst monitoring system of FIG. 2 during the method of FIG. 6.

If, at decision block 610, the networking engine 206 determines that the egress queue for the port has reached its threshold, the method 600 proceeds to block 616 where information about the egress frames in the shadow queue associated with the port is captured. Referring now to FIG. 7B, an embodiment of the port queues 700 is illustrated in which egress frames 712 and 714 have been stored in the egress queue 702 such that the threshold 702a is reached (and exceeded). As can be seen, the storage of the frames 712 and 714 in the egress queue 702 (e.g., according to block 606 of the method 600) results in the storage of associated egress frame information 712a and 714a in the shadow queue 704 (e.g., according to block 608 of the method 600). As discussed above, in embodiments, where memory space is limited and/or there exist other reasons for a relatively small shadow queue, the storage of information about the egress frames in the egress queue 702 may not be performed until a first threshold level of the egress queue 702 is reached. As such, in such an embodiment the shadow queue 704 in FIG. 7B would only include the egress frame information 712a and 714a (as that information would only be stored for the egress frames 712 and 714 that exceeded the threshold 702a), and the threshold level reached at block 610 would be the egress queue 702 reaching capacity and triggering the capture of the egress frame information 712a and 714a. One of skill in the art in possession of the present disclosure will appreciate that the difference between the threshold 702a and the capacity of the egress queue 702 may be much larger than that illustrated in FIG. 7B such that information about many more egress frames is captured in response to a microburst event.

In an embodiment of block 616, the networking engine 206 notifies the control engine 208 that the egress queue 214a has reached its threshold and, in response the control engine 208 accesses the shadow queue 214b and captures the information about the egress frames that is stored in the shadow queue 214b. For example, any of the Ethernet switch ASICs 302, 402, and/or 502 in FIGS. 3, 4, and 5 may determine that the threshold 702a in the egress queue 702 has been reached (e.g., a microburst event has been stored in the shadow queue), and in response, notify the control processors 306, 410, and 510 using an interrupt signal and/or other notifications known in the art. In response, the control processors 306, 410, and 510 may poll the shadow queue 704 to capture the information about the egress frames that is stored in the shadow queue 704 and store that information in a memory system (e.g., a circular file, a flash memory device, a circular buffer in the memory system) for later analysis. In some embodiments, the control engine 208 may include an agent that is configured to access, read, tabulate, and/or otherwise capture information stored in the shadow queue 704. While that agent is described as being provided by control processors, in other embodiments, the agent may be embedded in the Ethernet switch ASICs, provided by the FPGA(s), and/or provided in a variety of other manners that would be apparent to one of skill in the art in possession of the present disclosure.

In some embodiments, the storage of information about egress frames in the shadow queue (as egress frames are stored in its associated egress queue) may be halted (e.g., in response to an instruction from the control engine 208) in order to allow the information about the egress frames in the shadow queue to be captured at block 616. As such, subsequent to the capture of the information in the shadow queue, the control engine 208 may restart, re-"arm", or otherwise resume the storage of information about egress frames in the shadow queue. In such embodiments, the networking engine 206 (e.g., the Ethernet switch ASIC and/or the FPGA) may operate to synchronize the shadow queue with the egress queue upon the resuming of such storage of information about egress frames in the shadow queue such that the egress frame information in the shadow queue matches the associated egress frames in the egress queue. In some embodiments, the shadow queue may be cleared subsequent to the capture of its information at block 616 (e.g., all the information about the egress queues that was captured at block 616 may be removed from the shadow queue).

The method 600 then proceeds to optional block 618 where the captured information may be analyzed and a throttling instruction may be sent to a source device. Block 618 is illustrated as optional as, in many embodiments, the analysis of the captured information may not be performed until well after a microburst event has been detected, captured, or has otherwise occurred. In such embodiments, the control engine 208 may send the captured information to a management system (e.g., through a network) for analysis of the microburst (or other congestion) event. As such, in those embodiments, the analysis of the captured information may be conducted some time period after the microburst event has ended (e.g., for possible reconfiguration of the network or other remedial action), and the sending of the throttling instruction to the source device may be not performed.

However, in some embodiments, the analysis of the captured information may provide for the addressing of the microburst event by determining the source(s) of the microburst event, and attempting to throttle the source device(s) associate with those source(s). As such, in one embodiment of optional block 618, the control engine 208 may send the captured information to a management system (e.g., through a network) for analysis, and that management system may determine one or more source devices associated with the egress frames that caused the egress queue to exceed its threshold (e.g., via the source address included in those egress frames), and send a throttling instruction to those source device(s) to cause those source device(s) to reduce or stop the sending of packets to the networking device 202. In another embodiment of optional block 618, the control engine 208 (or some other backend analysis system in the networking device 202) may be configured to analyze the captured information, determine one or more source devices associated with the egress frames that caused the egress queue to exceed its threshold (e.g., via the source address included in those egress frames), and send a throttling instruction to those source device(s) to cause those source device(s) to reduce or stop the sending of packets to the networking device 202. Such analysis may include determining one or more source devices associated with a majority of the egress frames in the egress queue, determining one or more source devices associated with egress frames that, if removed from the egress queue, would reduce the egress queue to below its threshold, etc. While a few examples of the analysis of the information about the egress frames in the shadow queue to determine a source device have been provided, one of skill in the art in possession of the present disclosure will recognize that other types of analysis of the egress frame information from the shadow queue to determine a source device will fall within the scope of the present disclosure.

The method 600 then proceeds to block 620 where egress frame(s) in the egress queue associated with the port are processed. In an embodiment, the performance of block 620 is substantially similar to block 612 discussed above, and results in the forwarding of the egress frames in the egress queue 214a through the port 210a. However, as can be seen, following block 620, the method 600 may proceed back to block 602 to restart the method 600 without removing the information about the processed egress frame(s) from the shadow queue associated with the port (as is performed in block 614, discussed above). Thus, in some embodiments, when the threshold of the egress queue is reached, the egress frames in the egress queue are processed and removed from the egress queue while the information about those egress frames may remain in the shadow queue. As such, the egress queue may continue transmitting egress frames while information about the egress frames that were in the egress queue upon the threshold being exceeded remains persistent in the shadow queue. This allows a complete picture to be captured of the egress frames in the egress queue from the time the threshold is passed (and in some embodiments, a time before the threshold was passed) and up until the time the egress frames no longer exceed the threshold of the egress queue. In some embodiments, upon the egress frames in the egress queue 702 being processed such that the threshold 702a is no longer exceeded, the information about those egress frames in the shadow queue 704 may be removed and/or the shadow queue 704 synchronized with the egress queue 702 as discussed above.

Figure 7C:
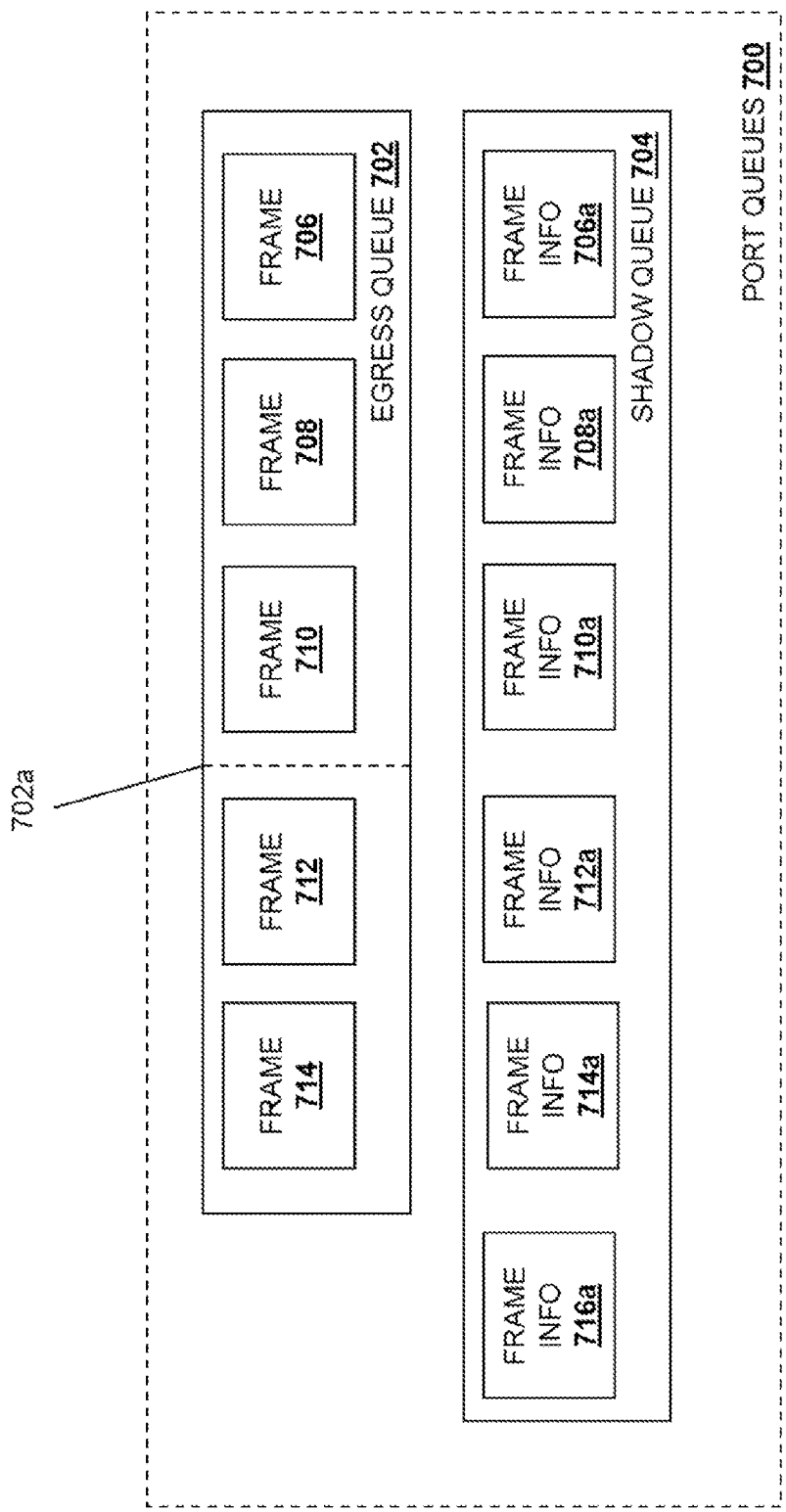
FIG. 7C is a schematic view illustrating an embodiment of queues in the microburst monitoring system of FIG. 2 during the method of FIG. 6.

Referring now to FIG. 7C, an embodiment of the port queues 700 is illustrated. In the illustrated embodiment, the egress frames 706, 708, 710, 712, and 714 have caused the egress queue 702 to reach the threshold 702a as well as filled up the egress queue 702. As discussed above, in such a situation, further egress frames directed to the port 210a will be dropped rather than stored in the egress queue 702. For example, egress frame 716 (not illustrated) may be directed to the egress queue 702 subsequent to the filling of the egress queue 702, and that egress frame 716 may have been dropped. However, as can be seen in FIG. 7C, information about that egress frame (e.g., the egress frame information 716a) has been stored in the shadow queue 704. Thus, in some embodiments, the shadow queue 704 may store information about egress frames that are not stored in the egress queue 702, and that information may be captured at block 616 substantially as discussed above for analysis. Furthermore, in some embodiments, a shadow queue may fill up, and in response the control engine 208 may capture the information in that shadow queue, clear that shadow queue, sync that shadow queue with its egress queue, and/or restart the storage of information about the egress frames in that shadow queue.

Thus, systems and methods have been described that provide for the storage of information about egress frames that are stored in an egress queue, along with the subsequent capture of that information when that egress queue exceeds a threshold. In some embodiments, such systems and methods allow for the monitoring of microburst events (e.g., when a threshold is reached) and the analysis of information captured from the shadow queue (e.g., during the microburst event, subsequent to the microburst event, etc.) so that the causes of that microburst event can be determined and possibly remedied. The storage of the egress frame information in a shadow queue that is separate from the egress queue and the capture of the egress frame information from that shadow queue upon a micro\burst event allows for a history of the egress queue to be captured without suspending operations of the egress queue that could cause congestion in the network. As such, the systems and methods provide improvements in microburst monitoring that collect egress frame information in a manner that allows for improved analysis and addressing of microburst events.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A microburst monitoring system, comprising:
a port;
a memory system including an egress queue that is associated with the port and configured to store egress frames, and a shadow queue that is associated with the port and configured to store information included in the egress frames stored in the egress queue;
a networking engine that is coupled to the port and the memory system, wherein the networking engine is configured to:
receive a plurality of packets;
process the plurality of packets to provide a plurality of egress frames for forwarding through the port;
store the plurality of egress frames in the egress queue;
store, in the shadow queue, a subset of information included in each of the plurality of egress frames that are stored in the egress queue; and
determine that the storage of the plurality of egress frames has caused the egress queue to reach a capture threshold and, in response, provide a notification to a control engine to cause the subset of information that is stored in the shadow queue and that is included in each of the plurality of egress frames that are stored in the egress queue to be captured from the shadow queue.

2. The microburst monitoring system of claim 1, wherein the networking engine is provided by a primary processing system that stores the plurality of egress frames in the egress queue, and a secondary processing system that is different than the primary processing system and that stores the subset of information included in each of the plurality of egress frames in the shadow queue.

3. The microburst monitoring system of claim 1, wherein the memory system includes a first memory device that includes the egress queue, and a second memory device that is different than the first memory device and that includes the shadow queue.

4. The microburst monitoring system of claim 1, wherein the networking engine is configured to:
process a first packet to provide a first egress frame for forwarding through the port;
drop the first egress frame in response to determining that the egress queue is full; and
store a subset of information included in the first egress frame in the shadow queue.

5. The microburst monitoring system of claim 1, wherein the networking engine is configured to:
forward at least some of the plurality of egress frames in the egress queue through the port after the storage of the plurality of egress frames has caused the egress queue to reach the capture threshold.

6. The microburst monitoring system of claim 1, wherein the networking engine is configured to:
forward a first egress frame of the plurality of egress frames in the egress queue through the port before the storage of the plurality of egress frames has caused the egress queue to reach the capture threshold and, in response, remove a subset of information included in the first egress frame that is stored in the shadow queue from the shadow queue.

7. An information handling system (IHS), comprising:
a chassis;
a port included on the chassis;
a control processing system located in the chassis;
a memory system that is located in the chassis and that includes:
an egress queue that is associated with the port configured to store egress frames; and
a shadow queue that is associated with the port and configured to store information included in the egress frames stored in the egress queue;
a networking processing system located in the chassis and coupled to the port, the control processing system, and the memory system, wherein the networking processing system is configured to execute instructions to:
provide a plurality of egress frames for transmitting through the port;
store the plurality of egress frames in the egress queue;
store, in the shadow queue, a subset of information included in each of the plurality of egress frames that are stored in the egress queue; and
provide a notification to the control processing system that the storage of the plurality of egress frames has caused the egress queue to reach a capture threshold, wherein the notification causes the control processing system to capture the subset of information that is stored in the shadow queue and that is included in each of the plurality of egress frames that are stored in the egress queue.

8. The IHS of claim 7, wherein the networking processing system is provided by at least one Ethernet switch processing system that stores the plurality of egress frames in the egress queue, and a secondary processing system that is different than the Ethernet switch processing system and that stores the subset of information included in each of the plurality of egress frames in the shadow queue.

9. The IHS of claim 7, wherein the memory system includes a first memory device that includes the egress queue, and a second memory device that is different than the first memory device and that includes the shadow queue.

10. The IHS of claim 7, wherein the networking processing system is configured to execute instructions to:
provide a first egress frame for transmitting through the port;
drop the first egress frame in response to determining that the egress queue is full; and
store a subset of information included in the first egress frame in the shadow queue.

11. The IHS of claim 7, wherein the networking processing system is configured to execute instructions to:
transmit at least some of the plurality of egress frames in the egress queue through the port after the storage of the plurality of egress frames has caused the egress queue to reach the capture threshold.

12. The IHS of claim 7, wherein the networking processing system is configured to execute instructions to:
transmit a first egress frame of the plurality of egress frames in the egress queue through the port before the storage of the plurality of egress frames has caused the egress queue to reach the capture threshold and, in response, remove a subset of information included in the first egress frame that is stored in the shadow queue from the shadow queue.

13. The IHS of claim 7, wherein the control processing system is configured to analyze the subset of information about each of the plurality of egress frames in the egress queue that was captured from the shadow queue and, in response, send a throttling instruction, determined from the subset of information, over a network to a source device.

14. A method for monitoring microbursts, comprising:
receiving, by a networking device, a plurality of packets;
processing, by the networking device, the plurality of packets to provide a plurality of egress frames for forwarding through a port;
storing, by the networking device in an egress queue in a memory system, the plurality of egress frames;
storing, by the networking device in a shadow queue in the memory systems, a subset of information included in each of the plurality of egress frames that are stored in the egress queue; and
determining, by the networking device, that the storage of the plurality of egress frames has caused the egress queue to reach a capture threshold and, in response, capturing the subset of information that is stored in the shadow queue and that is included in each of the plurality of egress frames that are stored in the egress queue.

15. The method of claim 14, wherein the networking device includes a primary processing system that stores the plurality of egress frames in the egress queue, and a secondary processing system that is different than the primary processing system and that stores the subset of information about each of the plurality of egress frames in the shadow queue.

16. The method of claim 14, wherein the memory system includes a first memory device that includes the egress queue, and a second memory device that is different than the first memory device and that includes the shadow queue.

17. The method of claim 14, further comprising:
processing, by the networking device, a first packet to provide a first egress frame for forwarding through the port;
dropping, by the networking device, the first egress frame in response to determining that the egress queue is full; and
storing, by the networking device in the shadow queue in the memory system, a subset of information included in the first egress frame.

18. The method of claim 14, further comprising:
forwarding, by the networking device, at least some of the plurality of egress frames in the egress queue through the port after the storage of the plurality of egress frames has caused the egress queue to reach the capture threshold.

19. The method of claim 14, further comprising:
forwarding, by the networking device, a first egress frame of the plurality of egress frames in the egress queue through the port before the storage of the plurality of egress frames has caused the egress queue to reach the capture threshold and, in response, removing a subset of information included in the first egress frame from the shadow queue.

20. The method of claim 14, further comprising:
analyzing, by the networking device, the subset of information that was captured about each of the plurality of egress frames in the egress queue from the shadow queue and, in response, sending a throttling instruction, determined from the captured information, over a network to a source device.

* * * * *

UNITED STATES PATENT AND TRADEMARK OFFICE
CERTIFICATE OF CORRECTION

PATENT NO.        : 9,917,762 B2
APPLICATION NO.   : 14/793126
DATED             : March 13, 2018
INVENTOR(S)       : Victor B. Teeter et al.

Page 1 of 1

It is certified that error appears in the above-identified patent and that said Letters Patent is hereby corrected as shown below:

In the Claims

In Claim 14, Column 18, Line 49: please replace "systems" with --system--.

Signed and Sealed this
Tenth Day of July, 2018

Andrei Iancu
*Director of the United States Patent and Trademark Office*